US009759936B2

(12) United States Patent
Chen

(10) Patent No.: US 9,759,936 B2
(45) Date of Patent: Sep. 12, 2017

(54) SEALING FRAME, BACKLIGHT MODULE, DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventor: Jia Chen, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 138 days.

(21) Appl. No.: 14/429,837

(22) PCT Filed: Jun. 30, 2014

(86) PCT No.: PCT/CN2014/081240
§ 371 (c)(1),
(2) Date: Mar. 20, 2015

(87) PCT Pub. No.: WO2015/109760
PCT Pub. Date: Jul. 30, 2015

(65) Prior Publication Data
US 2016/0018690 A1 Jan. 21, 2016

(30) Foreign Application Priority Data
Jan. 24, 2014 (CN) .......................... 2014 1 0036000

(51) Int. Cl.
*G02F 1/1333* (2006.01)
*A47B 81/06* (2006.01)
(Continued)

(52) U.S. Cl.
CPC ........ *G02F 1/133308* (2013.01); *A47B 81/06* (2013.01); *H05K 5/0017* (2013.01);
(Continued)

(58) Field of Classification Search
None
See application file for complete search history.

(56) References Cited

U.S. PATENT DOCUMENTS 5,002,368 A * 3/1991 Anglin .............. G02F 1/133308
  248/634
5,838,401 A * 11/1998 Uehara .............. G02F 1/133308
  349/150
(Continued)

FOREIGN PATENT DOCUMENTS

CN 1687829 A 10/2005
CN 101105597 A 1/2008
(Continued)

OTHER PUBLICATIONS

First Chinese Office Action dated Jul. 3, 2015; Appln. No. 201410036000.7.
(Continued)

*Primary Examiner* — Ryan Crockett
(74) *Attorney, Agent, or Firm* — Ladas & Parry LLP

(57) ABSTRACT

A sealing frame, a backlight module and a display device. The sealing frame includes a frame made of hard materials and barrier wall portions made of soft materials. The frame is for supporting, positioning and protecting various components of the backlight module, embedding the display panel, and avoiding damages of all functional layers due to collision, pressure and the like. The barrier wall portions correspond to the corners of the display panel for protecting key corners of the liquid crystal display panel, and prevent- (Continued)

ing damage of the liquid crystal display panel due to contact with the hard plastic part under external force.

18 Claims, 4 Drawing Sheets

(51) Int. Cl.
*H05K 5/00* (2006.01)
*G02F 1/1335* (2006.01)

(52) U.S. Cl.
CPC .............. *G02F 1/133608* (2013.01); *G02F 2001/133317* (2013.01); *G02F 2201/503* (2013.01)

(56) References Cited

U.S. PATENT DOCUMENTS

| | | | | |
|---|---|---|---|---|
| 6,839,100 | B1* | 1/2005 | Saito | G02B 6/009 349/58 |
| 2005/0057703 | A1* | 3/2005 | Tsubokura | G02F 1/13394 349/58 |
| 2007/0053207 | A1* | 3/2007 | Kokogawa | G02B 6/009 362/614 |
| 2008/0062722 | A1* | 3/2008 | Wang | G02F 1/133608 362/633 |
| 2008/0100769 | A1* | 5/2008 | Hsiao | G02F 1/133308 349/58 |
| 2009/0091878 | A1* | 4/2009 | Kawaguchi | G02F 1/133308 361/679.01 |
| 2010/0188599 | A1* | 7/2010 | Arihara | G02B 6/0055 349/60 |
| 2012/0002130 | A1* | 1/2012 | Watanabe | G02B 6/0088 349/60 |
| 2013/0033657 | A1* | 2/2013 | Li | G02F 1/133615 349/60 |
| 2013/0100370 | A1* | 4/2013 | Chen | G02F 1/133308 349/58 |
| 2013/0271692 | A1* | 10/2013 | Kuo | G02F 1/133308 349/58 |
| 2014/0022488 | A1* | 1/2014 | Yu | G02F 1/133308 349/60 |
| 2016/0079663 | A1* | 3/2016 | Youm | H01Q 1/40 343/702 |

FOREIGN PATENT DOCUMENTS

| | | |
|---|---|---|
| CN | 101105598 A | 1/2008 |
| CN | 101169564 A | 4/2008 |
| CN | 101876758 A | 11/2010 |
| CN | 102243392 A | 11/2011 |
| CN | 102352985 A | 2/2012 |
| CN | 202253135 U | 5/2012 |
| CN | 103791467 A | 5/2014 |
| JP | 2006-054140 A | 2/2006 |
| WO | 2013177805 A1 | 5/2013 |

OTHER PUBLICATIONS

Second Chinese Office Action Appln. No. 201410036000.7; Dated Dec. 8, 2015.
Third Chinese Office Action dated May 16, 2016; Appln. No. 201410036000.7.
International Search Report Appln. No. PCT/CN2014/081240; Dated Oct. 28, 2014.
Written Opinion of the International Searching Authority Appln. No. PCT/CN2014/081240; Dated Oct. 28, 2014.

* cited by examiner

SEALING FRAME, BACKLIGHT MODULE, DISPLAY DEVICE

FIELD

The invention relates to a sealing frame, a backlight module and a display device.

BACKGROUND

Liquid crystal display device has advantages of light weight, compact, low power consumption, so it is widely used in modern information equipment. As the liquid crystal display device (LCD for short) doesn't have a characteristic of self-luminescence, it depends on a backlight for offering enough and uniformly distributed light sources to achieve the display function, so the quality of backlight module affects the quality of the LCD directly. Under the development of the liquid crystal display device is trending towards a narrow frame, the backlight module should both meet the appearance requirement of narrow frame and protect the LCD efficiently while offering light source. The four corners of the LCD are most likely to be damaged when being subjected to external force, so it is extremely important to protect the corners of the LCD.

FIG. 1 is a simplified structural schematic view of a backlight module known by the present inventors. Referring to FIG. 1, in the design of the backlight module, the material of sealing frame 1 is hard plastic. Referring to FIG. 2, the sealing frame 1 is formed in a single piece by a molding process.

In order to protect the four corners of the display panel 2, the corresponding corners of the sealing frame 1 in backlight module are designed as escape angle portions 5, referring to FIG. 3. FIG. 3 is an enlarged view of area A shown in FIG. 1. The escape angle portion 5 can prevent damage to the liquid crystal display panel 2 due to the stress generated between the corners of the display panel 2 and the sealing frame 1 made of hard plastic material under external force.

With the development of the narrow frame of the display device, the corresponding backlight module also demands for a narrower and narrower frame. When the wall thickness of the sealing frame 1 is too thin, the escape angle portion 5 cannot be made at the corners, since the escape angle portion 5 cannot be made by the injection molding process if the wall thickness of the sealing frame 1 is too thin. Under this condition, it is necessary to increase the thickness of the wall of the sealing frame 1 accordingly to ensure the molding design of the escape angle portion 5, which is in conflict with narrow frame design. Therefore the escape angle portion 5 is omitted consequently, which will increase the risk of damage of corner parts of the display panel 2.

SUMMARY

Embodiments of the invention provide a sealing comprising a frame for holding a display panel; and a barrier wall portion at a joint of two adjacent sides of the frame. The barrier wall portion is elastically deformable.

For example, the sealing frame comprises a rectangular frame and barrier wall portions arranged in four corners of the rectangular frame.

For example, the barrier wall portion comprises two side parts perpendicular to each other and connected to the two adjacent sides of the frame respectively, and the two side portions of the barrier wall portion have an arc shape joint.

For example, the barrier wall portion is made of a thermoplastic elastomer material.

For example, the thermoplastic elastomer is butadiene styrene block copolymer or isoprene styrene block copolymer, thermoplastic trans natural rubber or thermoplastic polyurethane rubber.

For example, the frame is made of hard material.

For example, the hard material is polycarbonate, polyethylene or polypropylene.

For example, the frame and the barrier walls are formed integrally by a double color mold injection molding process.

For example, the barrier wall comprises a first side portion with a first length along one side of the frame, and a second side portion with a second length along another side of the frame; the first length and second length correspond to respective lengths of the corresponding sides of the display panel.

For example, the sealing frame has a concave portion for embedding the display panel, the barrier wall portion has a thickness along a direction perpendicular to a plane where the sealing frame is positioned, which is equal to a depth of the concave portion.

For example, the barrier wall portion and the frame have the same width on a plane where the display panel is positioned.

Embodiments of the invention provide a backlight module comprising a sealing frame described as above.

Embodiments of the invention provide a display device comprising a display panel and a backlight module described as above, the display panel is assembled in the sealing frame of the backlight module.

For example, the barrier wall portions of the sealing frame and the display panel are spaced apart by 0.1-0.15 mm.

A sealing frame, a backlight module and a display device are provided according to the embodiments of the invention, the sealing frame comprise a frame which is made of hard materials and barrier wall portions made of soft materials. The frame provides supporting, positioning and protecting functions on various backlight modules, and the display panel is embedded in the frame to avoid damage to all functional layers due to collision, pressure and the like. The barrier wall portions correspond to the corners of the display panel, and can protect key corner portions of the liquid crystal display panel, thus avoiding damage due to the contact under the external force.

DESCRIPTION OF THE EMBODIMENTS

Figure 1:
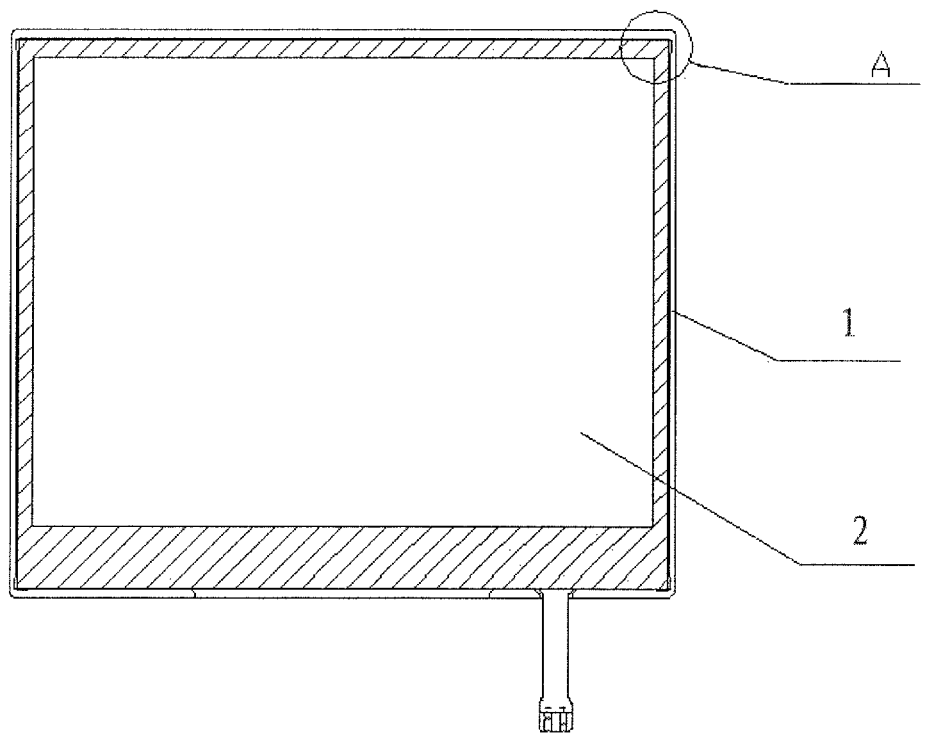
FIG. 1 is a simplified structural schematic view of a backlight module known by the present inventors.
Figure 2:
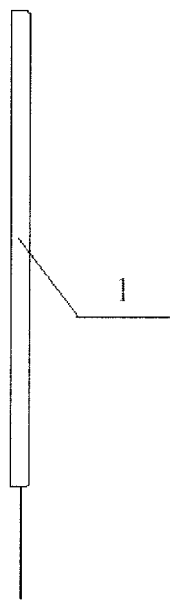
FIG. 2 is a side view of the sealing frame of the backlight module shown in FIG. 1.
Figure 3:
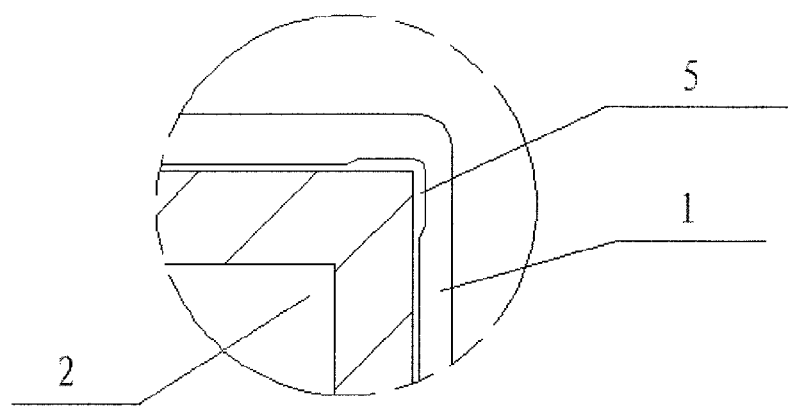
FIG. 3 is an enlarged view of area A shown in FIG. 1.

The technical solution of the embodiments of the present disclosure will be described clearly and fully in connection with the drawings of the embodiments of the present disclosure. It is obvious that the described embodiments are just a part but not all of the embodiments of the present disclosure. Based on the described embodiments of the present disclosure, those skilled in the art can obtain all other embodiment without any one ofventive work, which all fall into the scope of the claimed invention.

Unless otherwise defined, technical terms or scientific terms used herein shall have a common meaning known by those skilled in the art of the present disclosure. Words and expressions such as "first", "second" and the like used in the description and claims of the patent application of the present disclosure do not denote any sequence, quantity or importance, but distinguish different components. Likewise, words such as "a", "an" and the like do not denote quantitative restrictions, but denote the presence of at least one. Words such as "connected", "connecting" and the like are not restricted to physical or mechanical connections, but may include electrical connections, regardless of direct or indirect connections. Words such as "up", "below", "left", "right", etc., are only used to denote the relative positional relationship. Upon the absolute position of the described object changes, the relative positional relationship change correspondingly.

For those skilled in art to understand the technical solutions of the present invention better, the present invention will be further described in detail in accordance with the figures and the embodiments.

First Embodiment

Referring to FIGS. 4-8, the present embodiment provides a sealing frame and a backlight module comprising the sealing frame. A sealing frame 101 comprises a frame 104 for holding a display panel and a barrier wall portion 103 at a joint of two adjacent sides of the frame 104. The barrier wall portion 103 is elastically deformable.

It should be understood that based on the different arrangement of the backlight in LCD, the backlight can be divided into side type backlight and direct type backlight. In the side type backlight, the light sources are disposed on the sides of the LCD display panel, and in a direct type backlight, the light sources are disposed directly below the LCD display panel. The first embodiment is introduced as an example of the side type backlight module. The backlight module usually further comprises various components such as films, adhesive tapes, light-guide plate, light source and so on, which will not be described in detail herein.

The frame 104 of the sealing frame 101 is made of hard plastic material for supporting, positioning and protecting various components of the backlight module. The display panel can be embedded into the frame 104, for preventing damages of various functional layers due to unwanted collision, pressure and the like.

After the display panel 102 is embedded into the sealing frame 101, the corners of the display panel 102 correspond to the barrier wall portions 103 which is elastically deformable. The barrier wall portions 103 can be made of a soft material for protecting key corners of the liquid crystal display panel, and avoiding damages due to the contact with the hard plastic part under external force.

For instance, the barrier wall 103 is made of a thermoplastic elastomer material. It should be understood that it can also made of other elastic materials, as long as it can be formed integrally with the hard material of the frame 104 by a double color molds injection molding process.

For instance, the thermoplastic elastomer is any one selected from a butadiene styrene block copolymer or an isoprene styrene block copolymer, a thermoplastic trans natural rubber and a thermoplastic polyurethane rubber. It should be understood that it can also selected from other thermoplastic elastomer materials, as long as it can be formed integrally with the hard material of the frame 104 by a double color molds injection molding process.

For instance, the hard material is any one selected from polycarbonate, polyethylene and polypropylene. It should be understood that it can also selected from other hard materials, as long as it can be formed integrally with the thermoplastic elastomer material of the barrier wall portion 103 by a double color molds injection molding process. The double color molds injection molding process is an injection molding process in which a first material is injected into a die cavity through a main injection stage, and the space of the die cavity expands during cooling, then a second material is injected into a die cavity through a secondary injection stage, so as to finish the whole injection molding process. The die cavity expanding method comprises a so called "shrink core" techniques created by using movable inserts such as sliding panels, gates and so on; or using a rotating disk or a rotating mold core to transfer the product into a second die cavity for molding. The barrier wall portions and the frame of the sealing frame are made of two different materials according to present embodiment, and can be formed integrally by the double color molds injection molding process. The double color molds injection molding process has advantages of short injection molding period, high efficiency, high repeatability, stable quality, low rejection rate and so on, which can meet the production requirement of the sealing frame according to present embodiment.

Figure 4:
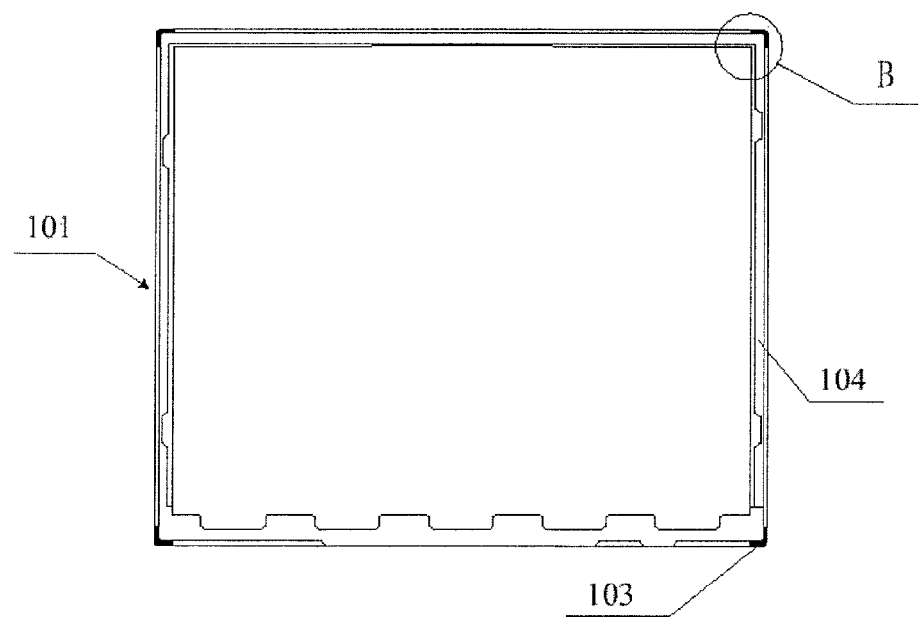
FIG. 4 is a simplified structural schematic view of a backlight module according to the first embodiment of the invention.

Referring to FIG. 4, the sealing frame 101 comprises a rectangular frame 104 and barrier wall portions 103 arranged in four corners of the rectangular frame 104. Usually the display panel is rectangular, the shape of the rectangular frame 104 corresponds to that of the display panel, thus the arrangement of the barrier wall portions 103 at four corners of the rectangular frame 104 is good for protecting the corners of the rectangular panel.

For instance, the barrier wall 103 comprises two side portions which are perpendicular to each other and connected to the two adjacent sides of the frame 104 respectively. The two side portions of the barrier wall portion have an arc shape joint.

For instance, the frame 104 and the barrier wall portions 103 are formed integrally by a double color molds injection molding process.

Figure 5:
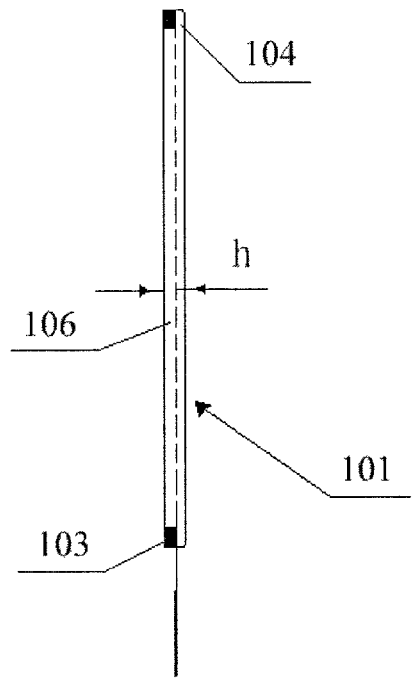
FIG. 5 is a side view of a sealing frame of a backlight module according to the first embodiment of the invention.

FIG. 5 is a side view of a sealing frame 101. Referring to FIG. 5, the sealing frame 101 has a concave portion 106 for embedding the display panel. The barrier wall portion 103 has a thickness (h shown in the drawing) along a direction perpendicular to a plane where the sealing frame 101 is positioned, which is equal to a depth of the concave portion 106. Therefore the corners of the display panel 102 can be protected in the entire thickness by the barrier wall portions 103.

Figure 6:
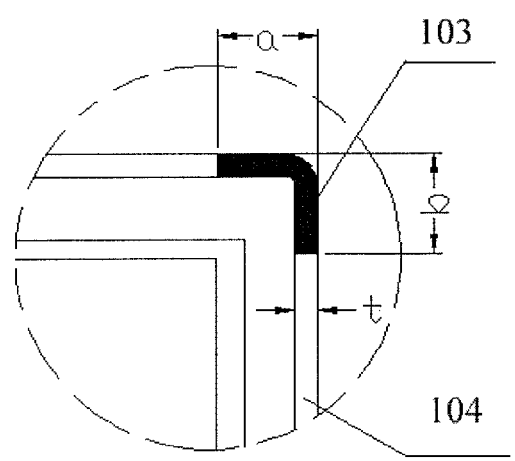
FIG. 6 is an enlarged view of an area B shown in FIG. 4.

FIG. 6 is an enlarge schematic view of an area B shown in FIG. 4. Referring to FIG. 6, the barrier wall portion 103 comprises a first side portion with a first length 'a' along one side of the frame 104, and a second side portion with a second length 'b' along another side of the frame 104. The first length 'a' and second length 'b' correspond to the respective size of the corresponding sides of the display panel. They can be lengthened or shortened according to the specific type and application of the display panel to be embedded.

Referring to FIG. 6, the wall thickness t of the barrier wall portion 103 is equal to the wall thickness of other parts of the frame 104. Therefore, it facilitates the injection molding and mold design.

When the display module according to present invention is subjected to an external force, the frame 104 of the sealing frame 101 can protect the four sides of the display panel, and the elastic deformable barrier wall portions 103 at the four corners of the sealing frame 101 can absorb the external force, and protect key four corners of the display panel, thus avoiding damages of the display panel under the external force.

Second Embodiment

The present embodiment provides a display device comprising a display panel and a backlight module described as above. The display panel is assembled in the sealing frame of the backlight module.

Figure 7:
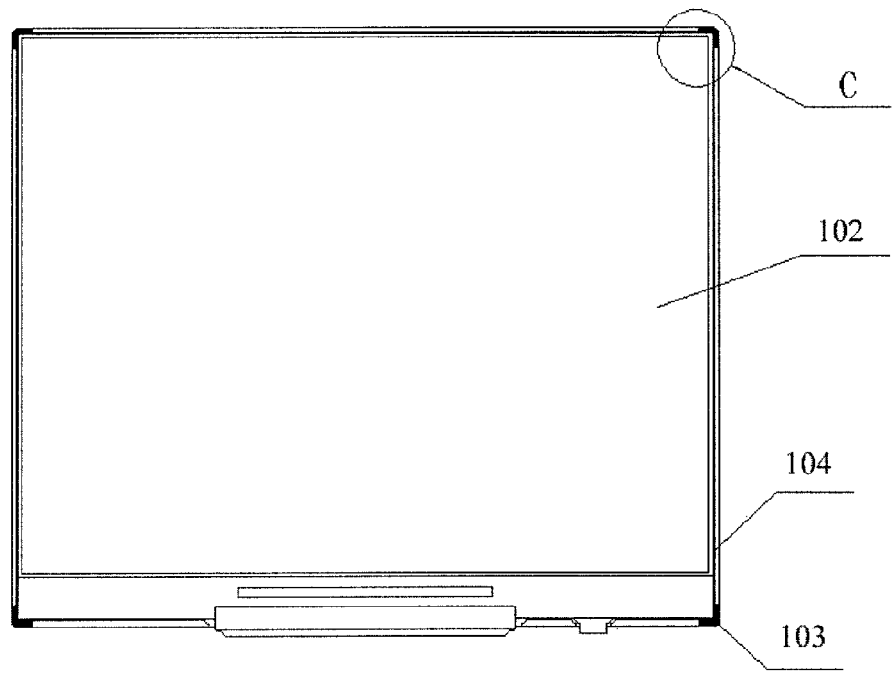
FIG. 7 is a simplified structural schematic view of a backlight module of a display device after embedding into a display panel according to a second embodiment of the invention.
Figure 8:
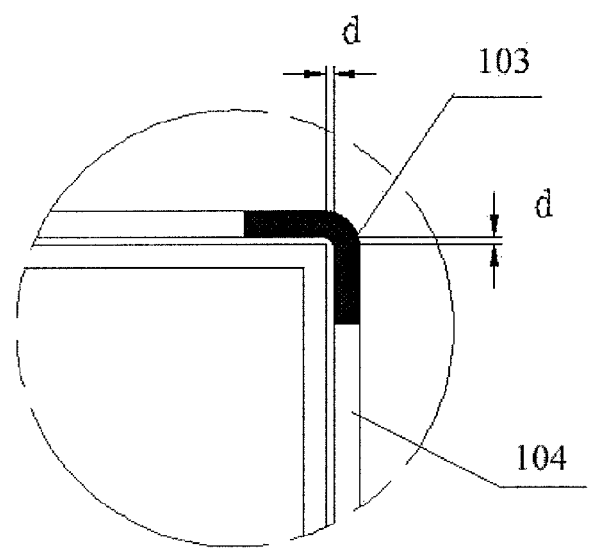
FIG. 8 is an enlarged view of an area C shown in FIG. 7.

FIG. 7 is a simplified structural schematic view of the display device. As shown in FIG. 7, the display panel 102 is protected by barrier wall portions 103 at four corners. FIG. 8 is an enlarged view of an area C shown in FIG. 7. The barrier wall portion of the sealing frame and the display panel are spaced apart by a distance d, so that a proper buffering distance d is disposed between the barrier wall portion 103 and the display panel, which facilitates the protection function of the barrier wall portions 103.

For instance, the distance d between the barrier wall portion 103 of the sealing frame 101 and the display panel is 0.1-0.15 mm.

When the display module according to present invention is subjected to external force, the frame 104 of the sealing frame 101 can protect the four sides of the display panel of the display device, and the elastic deformable barrier wall portions 103 at the four corners of the sealing frame 101 can absorb the external force, and protect key four corners of the display panel, thus avoiding damages of the display panel under the external force.

It should be understood that the above implementation is presented as an illustrative implementation for illustrating the principle of the present disclosure, not intended to limit the scope of the present disclosure. Those skilled in the art can make various modifications and improvements without departing from the spirit and scope of the present disclosure. These modifications and improvements should be intended to fall into the scope of the present disclosure.

The present application claims the priority of China Patent Application No. 201410036000.7 filed on Jan. 24, 2014, which is incorporated herein by reference in its entirety as part of the present application.

What is claimed is:

1. A sealing frame, comprising:
   a frame for holding a display panel; and
   a barrier wall portion at a joint of two adjacent sides of the frame,
   wherein the barrier wall portion is elastically deformable, and the frame and the barrier wall portion are of an integral structure, and the frame and the barrier wall portion are non-detachable, and
   the barrier wall portion is made of a the thermoplastic elastometer material, the frame is made of hard material; and the frame and the barrier walls are formed integrally by a double color molds injection molding process.

2. The sealing frame according to claim 1, wherein the sealing frame comprises a rectangular frame and barrier wall portions arranged in four corners of the rectangular frame.

3. The sealing frame according to claim 2, wherein the barrier wall portion comprises two side parts perpendicular to each other and connected to the two adjacent sides of the frame respectively, and the two side portions of the barrier wall portion have an arc shape joint.

4. The sealing frame according to claim 1, wherein the thermoplastic elastomer is butadiene styrene block copolymer or isoprene styrene block copolymer, thermoplastic trans natural rubber or thermoplastic polyurethane rubber.

5. The sealing frame according to claim 1, wherein the hard material is polycarbonate, polyethylene or polypropylene.

6. The sealing frame according to claim 1, wherein the barrier wall portion comprises a first side portion with a first length along one side of the frame, and a second side portion with a second length along another side of the frame; the first length and second length correspond to respective lengths of the corresponding sides of the display panel.

7. The sealing frame according to claim 1, wherein the sealing frame has a concave portion for embedding the display panel, the barrier wall portion has a thickness along a direction perpendicular to a plane where the sealing frame is positioned, which is equal to a depth of the concave portion.

8. The sealing frame according to claim 1, wherein the barrier wall portion and the frame have the same width on a plane where the display panel is positioned.

9. The sealing frame according to claim 1, wherein the barrier wall portion is in close contact with the frame.

10. The sealing frame according to claim 1, wherein a bottom surface and two side surfaces of the barrier wall portion are in close contact with the frame.

11. The sealing frame according to claim 1, wherein the barrier wall portion is provided with a uniform wall thickness.

12. The sealing frame according to claim 1, wherein a wall thickness of the barrier wall portion is equal to a wall thickness of the frame.

13. A backlight module comprising a sealing frame comprising:
    a frame for holding a display panel; and
    a barrier wall portion at a joint of two adjacent sides of the frame,
    wherein the barrier wall portion is elastically deformable, and the frame and the barrier wall portion are of an integral structure, and the frame and the barrier wall portion are non-detachable, and
    the barrier wall portion is made of a thermoplastic elastomer material, the frame is made of hard material; and the frame and the barrier walls are formed integrally by a double color molds injection molding process.

14. The backlight module according to claim 13, wherein the sealing frame comprises a rectangular frame and barrier wall portions arranged in four corners of the rectangular frame, the barrier wall portion comprises two side parts perpendicular to each other and connected to the two adjacent sides of the frame respectively, and the two side portions of the barrier wall portion have an arc shape joint.

15. The backlight module according to claim 13, wherein the sealing frame has a concave portion for embedding the display panel, the barrier wall portion has a thickness along a direction perpendicular to a plane where the sealing frame is positioned, which is equal to a depth of the concave portion.

16. The backlight module according to claim 13, wherein the barrier wall portion and the frame have the same width on a plane where the display panel is positioned.

17. A display device comprising a display panel and a backlight module comprising:
   a frame for holding a display panel; and
   a barrier wall portion at a joint of two adjacent sides of the frame,
   wherein the barrier wall portion is elastically deformable, and the frame and the barrier wall portion are of an integral structure, and the frame and the barrier wall portion are non-detachable, and the barrier wall portion is made of a thermoplastic elastomer material, the frame is made of hard material; and the frame and the barrier walls are formed integrally by a double color molds injection molding process;
   wherein the display panel is assembled in the sealing frame of the backlight module.

18. The display device according to claims 17, wherein the barrier wall portion of the sealing frame and the display panel are spaced apart by 0.1-0.15 mm.

\* \* \* \* \*